(12) United States Patent
Lockwood

(10) Patent No.: US 7,628,910 B2
(45) Date of Patent: Dec. 8, 2009

(54) PRESSURE REGULATOR AND FILTER FOR IRRIGATION SYSTEMS

(75) Inventor: George Henry Lockwood, Pompano Beach, FL (US)

(73) Assignee: Rain Bird Corporation, Azusa, CA (US)

( * ) Notice: Subject to any disclaimer, the term of this patent is extended or adjusted under 35 U.S.C. 154(b) by 596 days.

(21) Appl. No.: 11/205,524

(22) Filed: Aug. 17, 2005

(65) Prior Publication Data

US 2006/0131220 A1 Jun. 22, 2006

Related U.S. Application Data

(63) Continuation-in-part of application No. 11/088,486, filed on Mar. 24, 2005, now abandoned.

(60) Provisional application No. 60/557,444, filed on Mar. 29, 2004.

(51) Int. Cl.
*B01D 35/22* (2006.01)
(52) U.S. Cl. ...................... 210/106; 210/137
(58) Field of Classification Search .............. 210/106, 210/137, 407; 137/549
See application file for complete search history.

(56) References Cited

U.S. PATENT DOCUMENTS

| | | | |
|---|---|---|---|
| 4,081,171 A | * | 3/1978 | Morgan et al. ........... 251/30.02 |
| 4,353,385 A | | 10/1982 | Maisch et al. |
| 4,360,037 A | | 11/1982 | Kendall |
| 4,671,485 A | | 6/1987 | Saarem |
| 5,118,072 A | * | 6/1992 | Sakamoto et al. ........ 251/30.02 |
| 5,996,608 A | | 12/1999 | Hunter et al. |
| 6,139,727 A | | 10/2000 | Lockwood |
| 6,575,307 B2 | | 6/2003 | Lockwood |

* cited by examiner

*Primary Examiner*—Terry K Cecil
(74) *Attorney, Agent, or Firm*—Fitch, Even, Tabin & Flannery

(57) ABSTRACT

A control device for use with irrigation systems includes one or more of a solenoid-actuated valve, a pressure regulating valve, and a self-cleaning filter assembly. The filter assembly filters water flowing to the pressure regulating valve and the solenoid actuated valve. The filter assembly reciprocates a wiper over a filter screen to clean the screen. The wiper is on a shaft with one or more grooves that provides a pathway for unfiltered water to remove particulate matter from the filter assembly. The solenoid actuated valve controls the filter assembly and the pressure regulating valve. When the solenoid actuated valve is off, the pressure regulating valve is closed. When the solenoid actuated valve is on, water flows through the pressure regulating valve and also to a control chamber of the filter assembly.

20 Claims, 3 Drawing Sheets

PRESSURE REGULATOR AND FILTER FOR IRRIGATION SYSTEMS

CROSS-REFERENCE TO RELATED APPLICATION

This application is a continuation-in-part of U.S. application Ser. No. 11/088,486, filed Mar. 24, 2005, abandoned, which claims the benefit of U.S. Provisional Application No. 60/557,444, filed Mar. 29, 2004. This application hereby incorporates by reference both the foregoing related applications.

FIELD OF THE INVENTION

The present invention generally relates to control devices for use with irrigation systems and, more particularly, to a pressure regulator and filter for an irrigation system.

BACKGROUND OF THE INVENTION

Irrigation systems are used to provide water to a wide variety of devices, including, for example, spray nozzles, sprinkler heads, and drip hoses. Such systems generally make use of control valves to command the flow of water through the system, pressure regulators to even out variations in source water pressure, and filters to remove debris and particulate matter from the water flow.

Solenoid controlled on/off valves for use in irrigation systems are well known. For example, a solenoid-actuated valve uses a solenoid to command a small flow of control water, which, in turn, controls a larger flow of water to attached irrigation devices. Such solenoid-actuated valves often include relatively small passageways for the flow of control water and require the filtering of the control water to insure the removal of particulate matter which could block flow through the relatively small passageways. A filter may be placed upstream to filter the control water stream.

Water filters are also used in a wide range of applications to remove particulate matter from an irrigation water flow stream. Irrigation water supplies may contain fine particulate matter and debris capable of obstructing flow through sprinkler heads or low-flow emitter devices such as drip hoses. Thus, it is necessary to filter the irrigation water supply upstream of attached irrigation devices.

The aggregation of material on the upstream side of a filter can lead to a pressure drop across the filter medium and can significantly reduce water flow through the filter and adversely impact the performance of the irrigation system. Thus, it is also beneficial to be able to clean the filter medium. One known device uses scraper blades to clean the upstream surface of a filter each time the solenoid-actuated valve is opened or closed. Another known device is a self-cleaning filter device which is placed downstream from a control valve. This device filters the irrigation water stream and automatically cleans and back washes a filter on each on and off cycle of an upstream control valve.

Prior irrigation devices provide filters for the irrigation water or for the control water, but not both. Irrigation control devices and filters are generally located in the field, and it can be inconvenient and costly to manually clean the filters and purge them of debris and other particulate matter. Thus, there is a need for an improved self-cleaning filter assembly which cleans a filter on each on and off cycle of a control valve and which filters both the control water for use by a control valve and the irrigation water for use by the irrigation system.

DETAILED DESCRIPTION OF THE PREFERRED EMBODIMENT(S)

Figure 1:
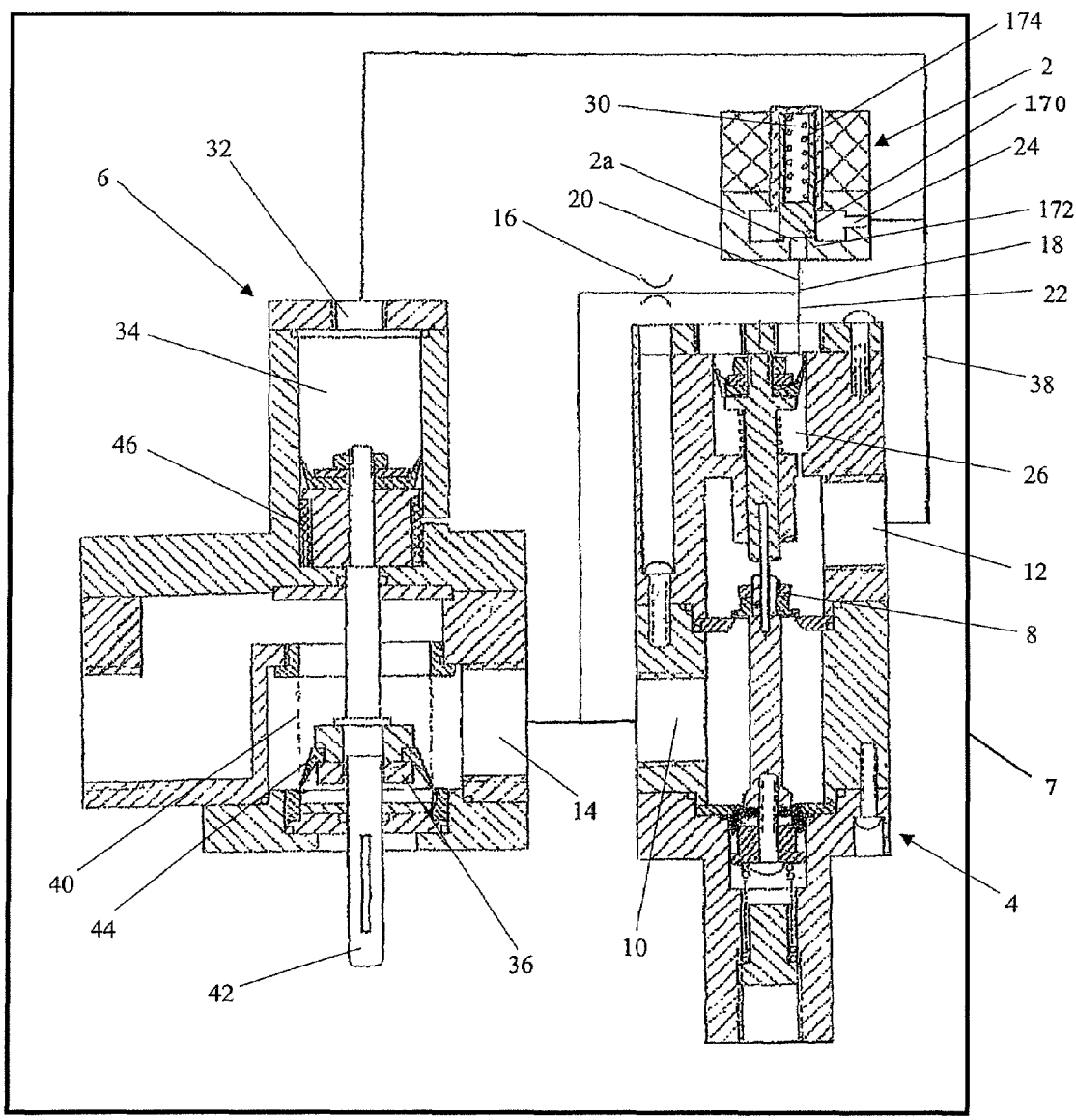
FIG. 1 is a cross-sectional view of a self-cleaning filter, a pressure regulator, and a solenoid-actuated valve embodying features of the present inventions.

With reference to FIG. 1, there is illustrated a solenoid-actuated valve 2, a pressure regulating valve 4, and a self-cleaning filter assembly 6, as an exemplary embodiment employing features in accordance with the present invention. These components are used to control fluid flow, such as water to an irrigation system. The solenoid-actuated valve 2 turns the flow in the irrigation system on or off by controlling a flow valve 8 in the pressure regulating valve 4. The pressure regulating valve 4 maintains water pressure stability between an inlet 10 and an outlet 12 of the valve 4. A self-cleaning filter assembly 6 is located upstream of both the solenoid-actuated valve 2 and the pressure regulating valve 4. Thus, water flow to both the solenoid-actuated valve 2 and the pressure regulating valve 4 is filtered to remove foreign matter that may otherwise interfere with the operation of the solenoid-actuated valve 2, the pressure regulating valve 4 or the irrigation system downstream. Although FIG. 1 illustrates the combination of the self-cleaning filter assembly 6 and the pressure regulating valve 4, other exemplary embodiments may use these components independently and still employ aspects in accordance with the present invention. In one form, the pressure regulator 4, the filter assembly 6, and the valve or control device 2 are incorporated into a single housing 7.

The solenoid-actuated valve 2 is used to control the flow between its on and off state of the irrigation system. The solenoid-actuated valve 2 is located downstream of the filter assembly 6. A portion of the flow of filtered water from the filter assembly outlet 14 is directed to a flow restrictor 16. The flow restrictor 16 limits the flow of filtered water to a very low rate, for example, less than ten gallons/hour. The output of the flow restrictor is directed to a T-connection 18 from which it can flow through passage 20 to the solenoid-actuated valve inlet 2a or through passage 22 to a two-way port 162 of a lockout chamber 26 of the pressure regulating valve 4.

The solenoid-actuated valve 2 includes a plunger valve 170 and a valve seat 172. In the flow "off" condition, the solenoid 30 is de-energized, and a spring 174 biases the plunger valve 170 into engagement with the valve seat 172 to shut off flow through the solenoid-actuated valve 2 between the inlet 2a and the outlet 24. This causes all of the water flowing from the restrictor 16 to flow into the lockout chamber 26. The flow into the lockout chamber 26 causes it to become pressurized, which forces a lockout piston shaft 28 in the chamber 26 to move downward to close the flow valve 8.

In the flow "on" condition, the solenoid 30 is energized to retract the plunger valve 170 and remove it from the valve seat 172 to open the solenoid-actuated valve 2. This allows flow through the solenoid-actuated valve 2 to the outlet 24. A portion of the flow from the solenoid-actuated valve outlet 24 is directed to a two-way port 32 of a control chamber 34 of the self-cleaning filter assembly 6. That flow pressurizes the control chamber 34 and causes the wiper assembly 36 to move to its downward position as described below. The remainder of the flow from the solenoid-actuated valve outlet 24 is directed to the irrigation system via passage 38.

During the normal course of operation, the irrigation system will cycle between flow "off" and flow "on" conditions. The control chamber 34 in the self-cleaning filter assembly 6 acts to operate the wiper assembly 36 to scrape the surface of a filter screen 40, in a manner described below, when the system transitions between the flow "off" and flow "on" conditions. When the irrigation system is switched on, a small flow of control water enters the control chamber 34 through the port 32, pressurizing the chamber 34 and urging a shaft 42 and wiper assembly 36 to a downward position. This movement causes the wiper 44 to scrape accumulated particulate matter from the upstream surface of the filter screen 40. When flow in the system is switched off, control water ceases to flow into the control chamber 34, and so, the control chamber 34 becomes depressurized. This depressurization allows a spring 46 to urge the shaft 42 and wiper assembly 36 into an upward position. This movement causes the wiper 44 to scrape the upstream surface of the filter screen 40 in the opposite direction.

Figure 2:
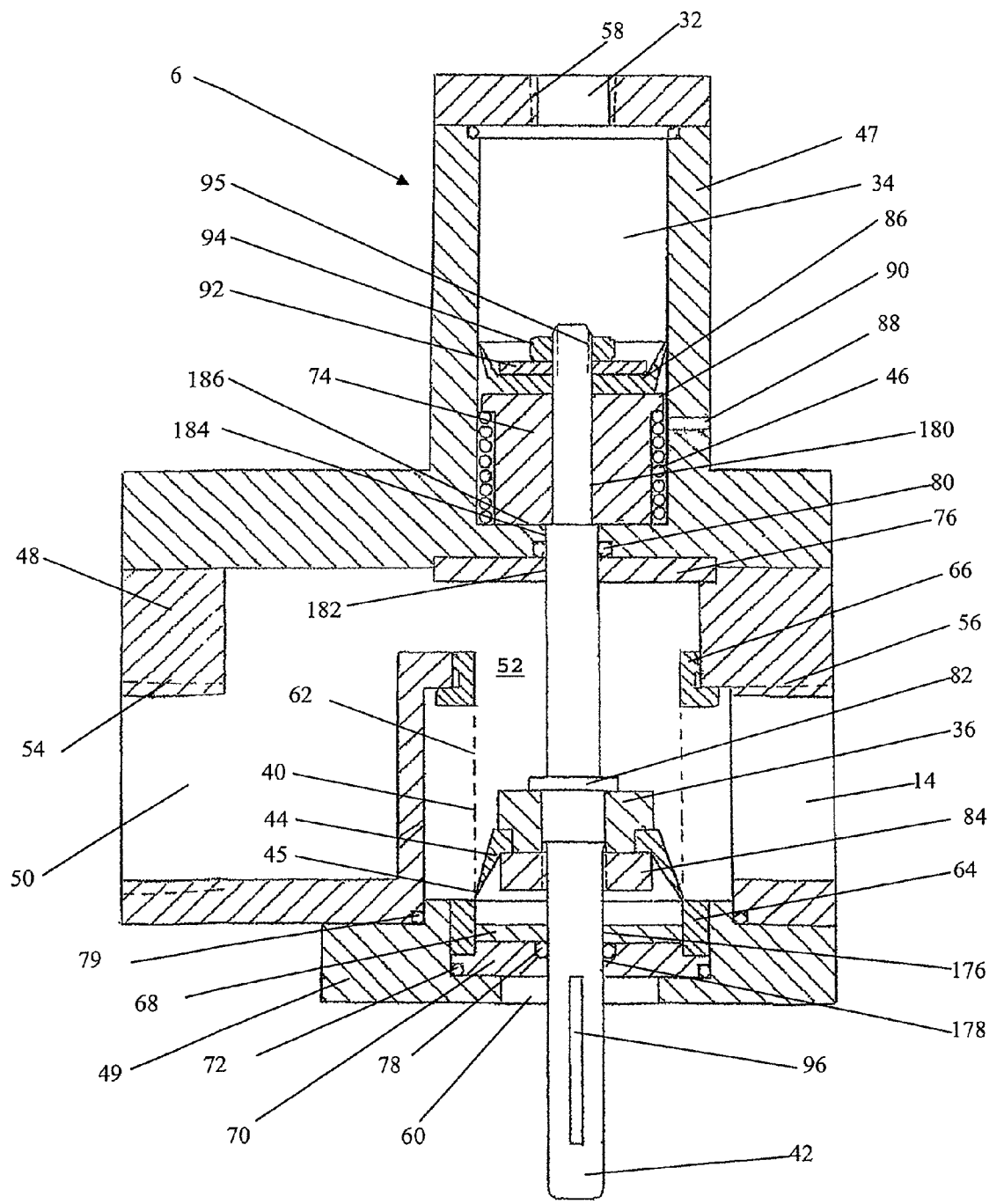
FIG. 2 is a cross-sectional view of the self-cleaning filter assembly of FIG. 1 in the flow on condition.

With reference to FIG. 2, the filter assembly 6 has a drive cylinder 47, a body 48 defining an inlet 50, an outlet 14 and a fluid flow passage 52 extending between the inlet 50 and the outlet 14, and an end cap 49. An o-ring 79 provides a watertight seal between the body 48 and the end cap 49. The inlet 50 and outlet 14 are designed for connection to piping or other conduit, such as by threads 54 and 56, respectively, or by friction engagements. The fluid flow passage 52 allows water to flow through the filter assembly 6. The filter screen 40 is located in the passage 52 to filter water that flows through the passage 52. The drive cylinder 47 also defines the cylindrical control chamber 34 having the two-way port 32. The port 32 is adapted for connection to a source of control water using threads 58, as shown, or a friction connection. An exit port 60 in the filter assembly end cap 49 allows filtered particulate matter to be discharged from the filter assembly 6 as described below.

The filter screen 40 preferably is comprised of a plastic or metallic material that defines a mesh of openings 62. Although the filter screen 40 may take on many different configurations and shapes, the preferred filter screen has a hollow, generally cylindrical shape. The filter screen 40 includes a lower end support 64 and an upper end support 66 to aid in maintaining the shape of the filter screen 40 and to aid in mounting the filter screen 40 in the filter assembly body 48. The lower end support 64 and the upper end support 66 are preferably comprised of plastic or metallic material.

End cap 49 is suitably attached and sealed to the filter assembly body 48 and locates lower end support 64 and valve plate 70. Valve plate 70 is sealed to the end cap 49 by o-ring 72. A bore 178 in valve plate 70 provides a slideable fit for the shaft 42. O-ring 78 provides a seal between the shaft 42 and the valve plate 70. The washer 68 retains the o-ring 78.

The round shaft 42, capable of reciprocating motion, extends from the control chamber 34 through a hole 180 defined by a spacer 74 in the control chamber 34. The shaft 42 then extends through a hole 182 defined by a top guide plate 76, along a central axis of the filter screen 40, through the hole 176 in the washer 68, and through the hole 178 in the valve plate 70. The lower end of the shaft 42 exits the filter assembly 6 through the valve plate 70 and then the exit port 60 defined by the end cap 49. O-ring 80 provides a water tight seal above the top guide plate 76.

The wiper 44 is fixed on the shaft 42 and reciprocates within the filter screen 40. The wiper 44 preferably has a frusto-conical shape with an annular knife edge formed by its downward-facing, larger diameter edge 45. The outside diameter of the wiper 44 is selected so that the wiper 44 will maintain contact with the filter screen 40 along the entire outside edge 45 of the wiper 44. The wiper 44 preferably is made from a flexible or resilient material. The wiper assembly 36 is fixed to the shaft 42 by means of a stop 82 and a locking nut 84.

The control chamber 34 is used to control the position of the wiper assembly 36 through the development of forces which reciprocate the shaft 42 along its longitudinal axis. The control chamber 34 is preferably in the shape of a cylinder. The central axis of the control chamber 34 is aligned with the central axis of the filter screen 40. A passage 184, sized to receive the shaft 42, connects the control chamber 34 to the fluid flow passage 52. The spring 46 is situated about the spacer 74 and between an upper annular flange 90 of the spacer 74 and a bottom 186 of the control chamber 34. The spring 46 provides an upward biasing force on a piston seal 86 to move the shaft 42 and the wiper 44 upward. The piston seal 86 also transmits hydraulic forces to the shaft 42 when the control chamber 34 is pressurized by a flow of control water to move the wiper 44 in the other direction. The drive cylinder 47 defines a vent hole 88 extending from the control chamber 34 below the piston seal 86 to outside of the filter assembly 6 to atmosphere. The vent hole 88 insures that the pressure beneath the piston seal 86 will remain atmospheric and allows the piston seal 86 to reciprocate in the control chamber 34.

More specifically, the spring 46 has a diameter sized to fit inside the control chamber 34 cylinder and has one end resting on the bottom surface 186 of the control chamber 34. The spacer 74 preferably has a cylindrical shape. The upper annular flange 90 of the spacer 74 rests on the top end of the spring 46. The spring 46 is preferably a helical spring, and the diameter of the cylindrical portion of the spacer 74 is such that it fits inside the spring 46 and provides lateral support for the spring 46 while not impeding axial motion of the spring 46. The diameter of the circular flange 90 is selected so that it is small enough to fit inside the control chamber 34 without causing excessive friction with the sides of the control chamber 34 while being large enough to retain the spring 46. The bias of the spring 46 is chosen so that in the absence of a predetermined hydraulic pressure from above, such as when the system is in a flow off condition, the spring 46 will urge the spacer 74, and thus, the piston seal 86 and shaft 42, to an upward position.

The piston seal 86 is fixed to the shaft 42 above the spacer 74 and is held in place by a mounting washer 92 and a locking nut 94, which may be attached to the shaft 42 by threads 95 along the upper end of the shaft 42. The piston seal 86 provides an essentially watertight seal with the control chamber 34. Hydraulic forces generated by control water flowing into the control chamber 34 through the port 32 when the irrigation system is in a flow "on" condition will urge the piston seal 86 downward against the bias of the spring 46, thereby compressing the spring 46 and causing the shaft 42 to move downward.

Filtered particulate matter is discarded from the filter assembly 6 via one or more grooves 96 defined by the lower region of the shaft 42. The grooves 96 are positioned axially along the shaft 42 so that when the shaft 42 is in its extreme upward position, the grooves 96 reside entirely above the valve plate 70, and the o-ring 98 seals against the shaft 42. When the shaft 42 is in its extreme downward position, the grooves 96 reside entirely below the valve plate 70, and the o-ring 98 again seals against the shaft 42. However, when the shaft 42 is in an intermediate position, such as during the upward or downward stroke of the shaft 42, the grooves 96 bridge the washer 68 and the valve plate 70 and create a passage for the flow of particulate matter and unfiltered water out of the filter assembly 6.

Figure 3:
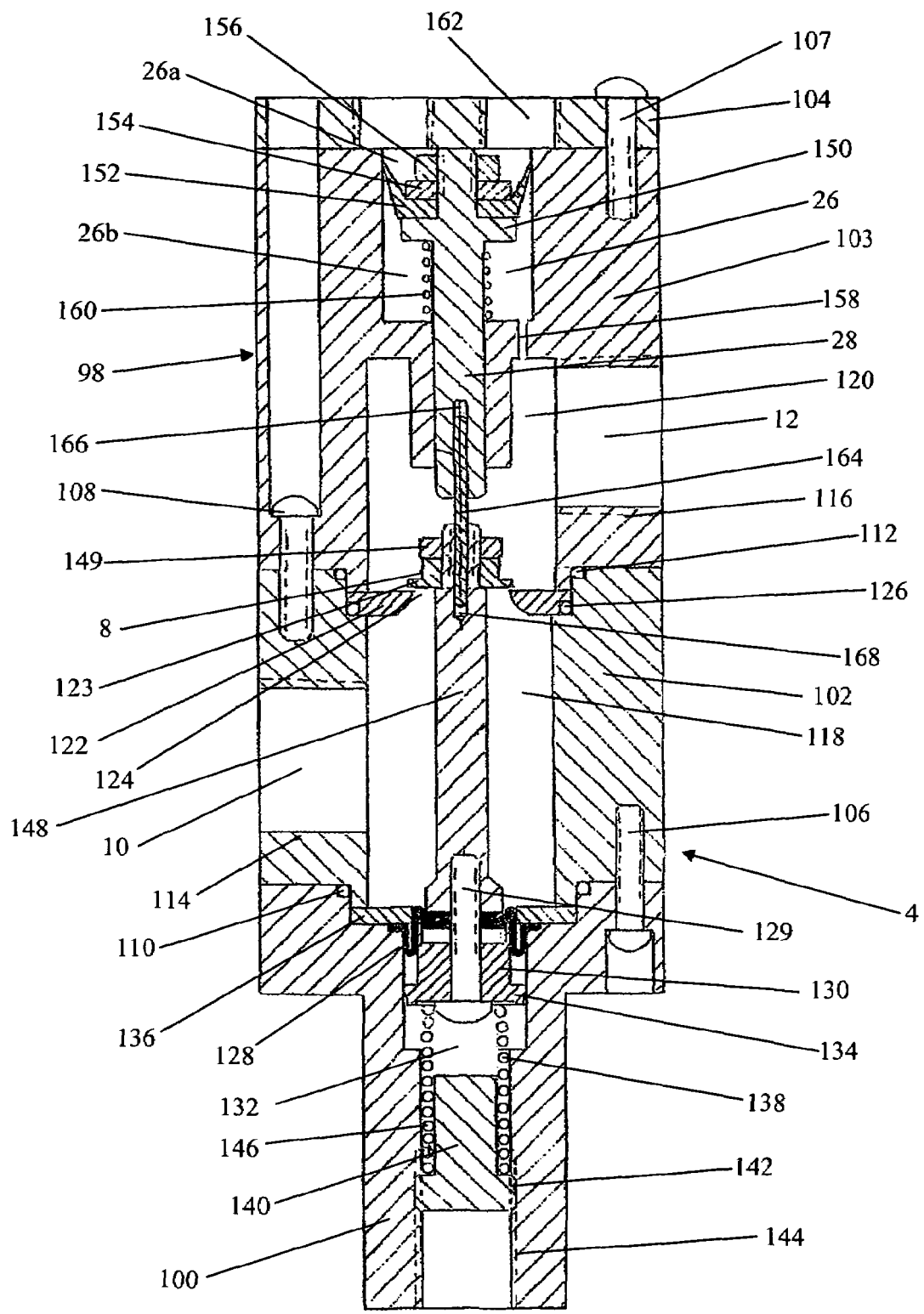
FIG. 3 is a cross-sectional view of the pressure regulator assembly of FIG. 1 in the flow on condition.

With reference to FIG. 3, the pressure regulating valve 4 has a main body 98 defining an inlet 10 and an outlet 12. The main body 98 is preferably constructed in four segments 100, 102, 103 and 104, which may be joined by a number of screws, 106, 107 and 108, and sealed together by o-rings 110 and 112. The inlet 10 and the outlet 12 are designed for connection to piping or other conduit, such as by threads 114 and 116, respectively, or by friction engagements. The pressure regulating valve 4 comprises three main chambers defined by the body 98: a system pressure chamber 118; an outlet chamber 120; and the lockout chamber 26.

The system pressure chamber 118 is separated from the outlet chamber 120 by a valve seat 122 which defines an aperture 124. An o-ring 126 provides a water tight seal between the valve seat 122 and the main body 98. At the opposite end of the system pressure chamber 118 from the valve seat 122, there is a rolling diaphragm 128. The rolling diaphragm 128 is supported in an axially displaceable manner by a spacer 130 which can reciprocate in a spring chamber 132. A flange 134 on the spacer 130, and a bottom plate 136 of the system pressure chamber 118 prevent the upward motion of the spacer 130 into the system pressure chamber 118. The spacer 130 is supported by a spring 138. The spring 138 biases the spacer 130 and rolling diaphragm 128 upward toward the system pressure chamber 118. The amount of spring bias is preselected by the position of an adjustment bolt 140, which can be turned to move the position of the bottom end of the spring 138. The further the adjustment bolt 140 is turned into the main body 48, the greater the spring 138 is pre-loaded and, thus, the greater the spring bias. The adjustment bolt 140 includes a larger diameter threaded portion 142 for engagement with threads 144 on the spring chamber 132 and a smaller diameter portion 146 which fits inside the spring 138. The spring is preferably a helical spring.

A pressure regulator shaft 148 is mounted to the rolling diaphragm 128. A screw 129 fixes the spacer 130 to the pressure regulator shaft 148. The pressure regulator shaft 148 extends through the aperture 124 in the valve seat 122 and into the outlet chamber 120. The flow valve 8 is fixed to the pressure regulator shaft 148 and held in place by a locking nut 149 and includes a valve head 123 sized to seat on the valve seat 122 to seal the aperture 124 when the diaphragm 128 and shaft are in their downward positions designed to prohibit flow through the valve 4. The flow valve head 123 and the rolling diaphragm 128 are sized such that the hydraulic force on the diaphragm 128 generated by the pressure of water in the system pressure chamber 118 will be equal to the opposing upward force on the flow valve head 123.

The function of the pressure regulating valve 4 is to supply, within practical limits, a flow of water at a predetermined constant pressure regardless of the flow rate. The system water supplied to the inlet 10 may be at varying pressures but must be maintained at a higher pressure than the desired pressure at the output 12. Since the water pressure supplied to the system pressure chamber 118 creates equal and opposite forces on the rolling diaphragm 128 and the flow valve head 123, the location of the pressure regulator shaft 148 is determined by the upward force of the spring 138 opposed by the downward hydraulic force of the pressure in the outlet chamber 120 acting on the flow valve head 123. Thus, if the pressure in the outlet chamber 120 decreases for any reason, the downward hydraulic force on the flow valve head 123 decreases and spring 138 will move the pressure regulator shaft 148 upward, causing the flow valve head 123 to open to increase the flow rate sufficiently and restore the pressure in the outlet chamber 120 to the desired value. Conversely, a pressure increase in outlet chamber 120 will cause the downward hydraulic force on the flow valve head 123 to increase and movement of the regulator shaft 148 downward will decrease the flow rate and maintain the desired output pressure.

The flow valve 8 also functions as an on/off valve. A lockout piston shaft 28 extends from the lockout chamber 26 into the outlet chamber 120 and is capable of reciprocating motion. The lockout piston shaft 28 includes an upper annular flange 150 and a piston seal 152. The piston seal 152 may be mounted to the shaft 28 using a washer 154 and a locking nut 156. The piston seal 152 provides an essentially water tight fit with the lockout chamber 26, dividing the chamber 26 into an upper portion 26a above the seal and a lower portion 26b below the seal 152. A vent port 158 provides fluid communication between the lower portion 26b of the lockout chamber 26 and the outlet chamber 120, enabling pressure equalization between the lower portion 26b of the lockout chamber 26 and the outlet chamber 120.

The pressure of the control water in the upper portion 26a of the lockout chamber 26 determines the position of the lockout piston shaft 28. The lockout piston shaft 28 is biased towards an upward position by a lockout spring 160. The preferred lockout spring 160 is a helical spring that surrounds a portion the lockout piston shaft 28. One end of the lockout spring 160 rests against the bottom surface 27 of the lockout chamber 28 and the other end presses against the upper annular flange 150 of the lockout piston shaft 28.

When the solenoid-actuated valve 2 is open, control water can flow freely through the solenoid-actuated valve 2 to join the flow from the outlet chamber 120 via the passage 38, and to the port 162 of the lockout chamber 26 via the passage 22. Thus, the control water supplied to the port 162 of the lockout chamber will essentially be at the same pressure as the outlet water pressure. In this situation, the net hydraulic force on the lockout piston seal 152 will be zero, and the bias of the spring 160 will hold the lockout piston shaft 28 in an upward position.

When the solenoid-actuated valve 2 is closed, the entire flow of control water from the restrictor 16 is directed into the lockout chamber 26 via the port 162. This flow pressurizes the upper portion 26a of the lockout chamber 26, forcing the lockout piston shaft 28 downward.

The lockout piston shaft 28 is linked to the pressure regulator shaft 148 by a slideable pin 164. The bottom portion of the lockout piston 28 and the top portion of the pressure regulator shaft 148 have central axial bores 166 and 168 aligned with each other and sized to receive the slidable pin 164. The depth of the bores 166 and 168 and the length of the slideable pin 164 are determined so as to allow vertical play when the lockout piston shaft 28 is in its extreme upward position, so that the regulator 4 can control the pressure in the outlet chamber 120 by varying the spacing between the valve head 123 and the valve seat 122 More specifically, when the solenoid-actuated valve 2 is open and the system is in a flow "on" condition, the lockout piston shaft 28 is in an upward position, and the vertical play in the slideable pin 164 allows the pressure regulator shaft 148 to move freely in conjunction with the rolling diaphragm 128. This allows the flow valve 8 to function as a pressure regulating valve. The pin 164 also allows the lockout piston shaft 28 to move downward and engage the pressure regulator shaft 148 until the flow valve 8 closes off when then lockout piston shaft 28 moves to an extreme downward position. The slideable pin 164 is sufficiently long so as to remain engaged in the bores 166 and 168 of both the lockout piston shaft 28 and the pressure regulator shaft 148 at all times during operation of the pressure regulator 4.

When the solenoid-actuated valve 2 is closed, the system is in a flow "off" condition and the upper portion 26a of the lockout chamber 26 will be pressurized, forcing the lockout piston shaft 28 to a downward position. In this condition, the slidable pin 164 is forced against the pressure regulating shaft 148, causing the flow valve 8 to close and shut off flow to the irrigation system.

The foregoing relates to a preferred exemplary embodiment of the invention. It is understood that other embodiments and variants are possible which lie within the spirit and scope of the invention as set forth in the following claims.

The invention claimed is:

1. An apparatus for use in controlling fluid flow comprising:
    a pressure regulator defining a first inlet, a first outlet and a first passageway extending therebetween and having a first valve and a first valve seat in the first passageway, the first valve being moveable into engagement with the first valve seat to close the first passageway to prohibit fluid flow therethrough and various other positions spaced from the first valve seat to regulate flow through the first valve seat;
    a filter assembly defining a second inlet, a second outlet and a second passageway extending therebetween, the second outlet is in fluid communication with the first inlet of the pressure regulator to filter the fluid entering the pressure regulator, and having a filter element and a wiper engaging the filter element to clean the filter element; and
    a control device being in communication with the pressure regulator and the filter assembly and having at least two settings, a first setting causing the first valve to engage the first valve seat to prohibit fluid flow through the pressure regulator and to cause the wiper of the filter to wipe across the filter element in a first direction to clean the filter element, and a second setting permitting the first valve to move away from the first valve seat to permit and regulate flow through the pressure regulator and to cause the wiper to wipe across the filter element in a second direction to clean the filter element.

2. An apparatus in accordance with claim 1 wherein the control device defines a third inlet, a third outlet and a third passageway extending therebetween, the third inlet being in fluid communication with the second outlet for the filter and the third outlet being in fluid communication with the filter assembly, the control device further comprising a second valve and a second valve seat in the third passageway, the second valve of the control device being selectively moveable into engagement with the second valve seat of the control device to prohibit flow through the control device which in turn causes the first valve to engage the first valve seat of the pressure regulator to prohibit flow through the pressure regulator and to cause the wiper of the filter to wipe across the filter element, the second valve being selectively moveable away from the second valve seat of the control device to permit flow through the control device which in turn permits the first valve to move between various positions spaced from the first valve seat to regulate flow through the first valve seat.

3. An apparatus in accordance with claim 2 wherein the control device comprises a first spring to bias the second valve into engagement with the second valve seat of the control device and an electrically-actuated solenoid to move the second valve away from the second valve seat of the control device when electrically energized.

4. An apparatus in accordance with claim 1 wherein the pressure regulator, the filter assembly and the control device are incorporated into a single housing.

5. An apparatus in accordance with claim 1 wherein the pressure regulator further defines a lockout chamber and a first two-way port at the lockout chamber, the first two-way port in fluid communication with the second outlet of the filter and a third inlet of the control device, and comprises a first piston in sealing engagement with the lockout chamber, a first piston shaft extending into the first passageway to move the first valve relative to the first valve seat, wherein fluid pressure increase in the lockout chamber when fluid flow is prohibited through the control device causes the first piston to move the first valve to engage the first valve seat of the pressure regulator to prohibit flow through the pressure regulator, and a spring biases the first piston such that the first valve is permitted to move away from the first valve seat when the control device permits flow therethrough.

6. An apparatus in accordance with claim 5 wherein the pressure regulator further comprises a slide pin that interconnects the first piston shaft and the first valve to permit the first valve to move relative to the first valve seat and defines a system pressure chamber as part of the first passageway, a spring biased diaphragm being disposed in the system pressure chamber to operate a second shaft connected to the first valve to move the first valve relative to the first valve seat to permit regulated fluid flow through the pressure regulator.

7. An apparatus in accordance with claim 6 wherein the pressure regulator defines a vent passage providing fluid communication between the lockout chamber and the first outlet.

8. An apparatus in accordance with claim 5 wherein the fluid communication between the second outlet and the first two-way port and the third inlet includes a restriction.

9. An apparatus in accordance with claim 5 wherein the filter assembly defines a control chamber having a second two-way port in fluid communication with the control device and a second piston seal capable of reciprocating movement in the control chamber, and has a second shaft interconnecting the second piston seal and the wiper such that reciprocating movement of the second piston seal causes reciprocating movement of the wiper across the filter element and a second spring disposed in the control chamber to exert a force on the second piston seal in a direction opposite to a hydraulic force exerted on the second piston seal from fluid in the control chamber.

10. An apparatus in accordance with claim 9 wherein fluid enters the control chamber through the second two-way port when the control device permits fluid flow therethrough, the fluid in the chamber causes the second piston seal to overcome the second spring bias and move the second shaft and the attached wiper across the filter to clean the filter, and when the control device prohibits flow therethrough, the second spring bias causes fluid to exit through the second two-way port and the wiper to wipe back across the filter to clean the filter.

11. An apparatus in accordance with claim 10 wherein the control chamber defines a vent port.

12. An apparatus in accordance with claim 10 wherein the second shaft defines at least one groove that permits foreign material wiped from the screen to be discharged from the filter assembly.

13. An apparatus in accordance with claim 12 wherein the groove is an elongated groove that extends longitudinally along the shaft.

14. An apparatus in accordance with claim 13 wherein the groove permits material wiped from the screen to be discharged from the filter assembly when the second shaft is in an intermediate position where the groove extends from inside the filter assembly to outside of the filter assembly.

15. An apparatus in accordance with claim 1 wherein the filter assembly includes a discharge opening to allow selective discharge of foreign matter removed from the filter element.

16. An apparatus in accordance with claim 1 wherein the filter element is a filter screen disposed in the passageway.

17. An apparatus in accordance with claim 16 wherein the filter screen is a cylindrical screen.

18. An apparatus for use in controlling fluid flow comprising:
   a filter assembly defining a first inlet, a first outlet and a first passageway extending therebetween, the filter assembly having:
      a filter element, a wiper engaging the filter element to clean the filter element,
      a control chamber having a two-way port, a piston seal capable of reciprocating movement in the control chamber, and a spring disposed in the control chamber and having a spring bias to exert a force on the piston seal in a direction opposite to a hydraulic force exerted on the piston seal from fluid in the control chamber, and
      a shaft interconnecting the piston seal and the wiper such that reciprocating movement of the piston seal causes reciprocating movement of the wiper across the filter element, wherein the shaft defines at least one groove that permits material wiped from the screen to be discharged from the filter assembly; and
   a control device being in communication with the two-way port and defining a second inlet, a second outlet and a second passageway extending therebetween, the second inlet being in fluid communication with the first outlet to filter the fluid entering the control device, the control device having at least two settings including:
      a first setting in which fluid flows from the control device and into the control chamber through the two way port. the fluid in the control chamber causing the piston seal to overcome the spring bias and move the shaft to cause the wiper to wipe across the filter element in a first direction to clean the filter element, and
      a second setting in which fluid is prohibited from flowing to the filter assembly from the control device, wherein the spring bias causes fluid to exit through the two-way port and the wiper to wipe back across the filter element in a second direction to clean the filter element.

19. An apparatus in accordance with claim 18 wherein the groove is an elongated groove that extends longitudinally along the shaft.

20. An apparatus in accordance with claim 19 wherein the groove permits material wiped from the screen to be discharged from the filter assembly when the shaft is in an intermediate position where the groove extends from inside the filter assembly to outside of the filter assembly.

\* \* \* \* \*

UNITED STATES PATENT AND TRADEMARK OFFICE
CERTIFICATE OF CORRECTION

PATENT NO. : 7,628,910 B2  Page 1 of 1
APPLICATION NO. : 11/205524
DATED : December 8, 2009
INVENTOR(S) : George Henry Lockwood It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,628,910 B2 | Page 1 of 1 |
| APPLICATION NO. | : 11/205524 | |
| DATED | : December 8, 2009 | |
| INVENTOR(S) | : George Henry Lockwood | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1029 days.

Column 10, line 11, after "port" change the "." to a ",".

Signed and Sealed this

Sixteenth Day of November, 2010

David J. Kappos
*Director of the United States Patent and Trademark Office*